United States Patent
Barger et al.

(10) Patent No.: US 7,069,184 B1
(45) Date of Patent: Jun. 27, 2006

(54) CENTRALIZED MONITORING AND EARLY WARNING OPERATIONS CONSOLE

(75) Inventors: Karl W. Barger, Flower Mound, TX (US); Gerald Michael Brennan, Southlake, TX (US); Kenneth Dale Durden, Frisco, TX (US); Joseph G. Laura, Plano, TX (US); Chris R. Weaver, Rockwall, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 309 days.

(21) Appl. No.: 10/681,930

(22) Filed: Oct. 9, 2003

(51) Int. Cl.
*G06F 11/30* (2006.01)

(52) U.S. Cl. ............... 702/186; 702/182; 702/183; 704/270; 709/220; 709/224; 709/223; 709/217; 709/227

(58) Field of Classification Search ......... 702/186, 702/182, 183; 709/224, 228, 200, 223, 217, 709/220, 227; 717/108, 116, 120; 704/270.1
See application file for complete search history.

(56) References Cited

U.S. PATENT DOCUMENTS

| | | | | |
|---|---|---|---|---|
| 6,070,190 A | * | 5/2000 | Reps et al. | 709/224 |
| 6,175,832 B1 | * | 1/2001 | Luzzi et al. | 707/10 |
| 6,801,940 B1 | * | 10/2004 | Moran et al. | 709/224 |

* cited by examiner

*Primary Examiner*—John Barlow
*Assistant Examiner*—Hien Vo

(57) ABSTRACT

An application monitoring system is provided. The application monitoring system includes a monitor component to monitor statistics related to an application in operation. A reporting component is in communication with the monitor component and is operable to capture the statistics of the application in operation monitored by the monitor component. A trigger component analyzes the statistics of the application monitored by the monitor component and compares the statistics of the application with a threshold and generates a trigger signal based on the relationship of the statistics of the threshold. A dashboard component is operable to identify the application to monitor and provide an application threshold. A method of monitoring an application using an application monitoring system is also provided.

28 Claims, 4 Drawing Sheets

CENTRALIZED MONITORING AND EARLY WARNING OPERATIONS CONSOLE

CROSS-REFERENCE TO RELATED APPLICATIONS

This application is related to U.S. patent application Ser. No. 10/682,463, entitled "System For Processing Data Retrieved From An Information Service Layer", and U.S. patent application Ser. No. 10/682,505, entitled "Information Service Layer", filed concurrently and incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The field of the present invention includes computer software. More particularly, embodiments of the present invention are concerned with monitoring enterprise operations and generating early warnings of operations non-performance.

BACKGROUND OF THE INVENTION

In a large corporate enterprise, management and operations information may be spread across multiple unrelated computer systems. It may be information from different computer programs (hereinafter referred to as applications)—for example, an operations control application supplying production or service delivery information and an accounting application supplying cost information—is needed to assess the performance of the enterprise at a high level. The information may be useful in calculating costs as a function of the level of performance rather than just the cost of operating. These and other calculations may be valuable to managers and executives making business decisions for the enterprise. But if the different applications are incompatible with one another this information may not be available or may not be available in a timely fashion or may not be available in a cost effective manner.

The enterprise may have two or more different mainframe computer systems, several UNIX computer systems, and many desktop computer systems which support different enterprise business applications. The different mainframe computer systems may be located at different physical locations and may be under the control of different units of the company. Each computer system may itself comprise a complex of applications, data, and databases. Some of the applications may be developed by the enterprise, while other applications may be developed by third parties. Some applications and systems may be very old.

The interface which may be used to extract information or data from one application may not work for any other application. The data format produced by one application may not be compatible with the data format produced by any other application. Attempting to communicate among different computer systems poses additional problems. The different operating systems on different computer systems may not support common communication mechanisms. For example, a UNIX computer system may support socket communications between independent machines while the mainframe computer system may not support socket communications.

To verify the successful progress of a large application, enterprise personnel may access data in files with a text editor and cut-and-paste this information directly into a commercial spreadsheet application in order to perform calculations on the progress of the application. This is a laborious and error prone process. If the process only fails 1% of the time—perhaps once every three months—this manual approach may be considered inefficient.

When an enterprise depends upon its deployed resources to support its production it may be desirable to be able to predict when growth will exhaust the deployed resources so additional resources can be deployed before growth is stalled.

SUMMARY OF THE INVENTION

The present embodiment provides a system for monitoring applications, programs, and computer systems. The system comprises a monitor component to monitor statistics related to an application in operation. The system includes a reporting component in communication with the monitor component and operable to capture the statistics of the application in operation monitored by the monitor component. A trigger component to analyze the statistics of the application monitored by the monitor component and compare the statistics of the application with a threshold and generate a trigger signal based on the relationship of the statistics to the threshold. A dashboard component operable to identify the application to monitor and provide an application threshold.

In one embodiment a method for monitoring an application is provided comprising selecting an application having data related to metrics of the application. The method includes providing a service layer including a control system having a registry and operable to receive the request for data, the request including a source identifier and a data identifier. A client service is operable to register with the control system and receive the request for data, the client service further operable to communicate a requested data related to the data identifier to the requester. A retrieval service operable to utilize at least a portion of the source identifier to retrieve the requested data related to the data identifier and communicate the requested data to the client service. The method includes obtaining the data from the information service layer, establishing a threshold for the data and monitoring the data. The method includes analyzing the data based on the threshold established for the data and warning when the data exceeds the threshold (or drops below the threshold).

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein but may be modified within the scope of the appended claims along with their full scope of equivalents.

Figure 1:
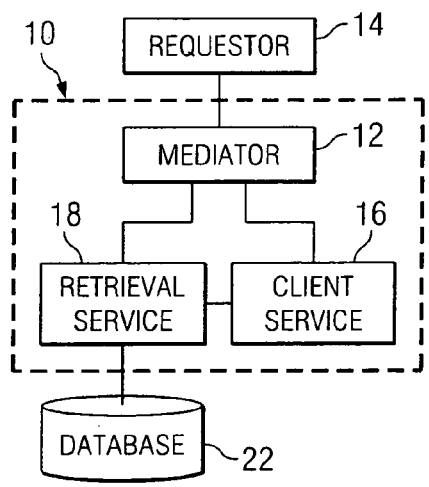
FIG. 1 is a block diagram, according to one embodiment, of the functional components of an information service layer of the present disclosure.

Turning now to FIG. 1 an information service layer (ISL) 10 is depicted. The ISL 10 enables searching for and obtaining data as well as invoking commands across disparate computer systems or computer platforms in a manner which makes the differences of these systems and platforms transparent to the user of the ISL 10. Note that unlabeled drawing lines between labeled elements in FIG. 1 and subsequent figures indicate that the labeled elements may be in communication. The communication may be unidirectional or bidirectional. The communication may be supported by executing function calls, by employing interprocess communication mechanisms, by electrical conductors, or other means.

A mediator 12 receives requests from a requestor 14 for information or data stored in a computer system or for the computer system to execute commands. The mediator 12, may also be referred to as a control system. The requestor 14 may also be referred to as a request builder. The requestor 14 may execute on, for example, a desktop computer, a UNIX computer system, or a mainframe computer system different from the computer system on which the ISL 10 executes. The requestor 14 may execute, in some embodiments, on the computer system on which the ISL 10 executes. The mediator 12 delegates responsibility to handle the request from the requestor 14 to a client service 16.

The client service 16 is an application which reads through the request sent by the requester 14 and acts to satisfy the request.

In some embodiments the initiating communication between the requester 14 and the mediator 12 does not contain a request but merely a handshake to establish communications. The mediator 12 may hand off completion of the communications handshake to the client service 16. The client service 16 establishes communications with the requestor 14 and receives the request directly from the requestor 14 without being routed through the mediator 12.

The client service 16 communicates with a retrieval service 18 which is an application that interacts with a database 22 to access and collect the requested data or to issue commands to the database 22. The retrieval service 18 returns the requested data to the client service 16. The client service 16 returns the requested data to the mediator 12. The mediator 12 returns the requested data to the requestor 14.

While the embodiment depicted in FIG. 1 shows the retrieval service 18 retrieving data from a database 22, in other embodiments the retrieval service 18 may retrieve data from an active computer application, from a file system, or from some other source. While only one requestor 14 is depicted, the mediator 12 is intended to accept requests from multiple requestors 14. In some embodiments the mediator 12 may hand-off communication information to the client service 16 enabling the client service 16 to communicate directly to the requester 14 and to return the requested information or data directly to the requestor 14 without the intervention of the mediator 12.

The ISL 10 and its components may execute on a general purpose computer system. General purpose computer systems are discussed in more detail hereinafter. The various components of the ISL 10 may execute on the same computer or they may execute on different and separate computers.

Figure 2:
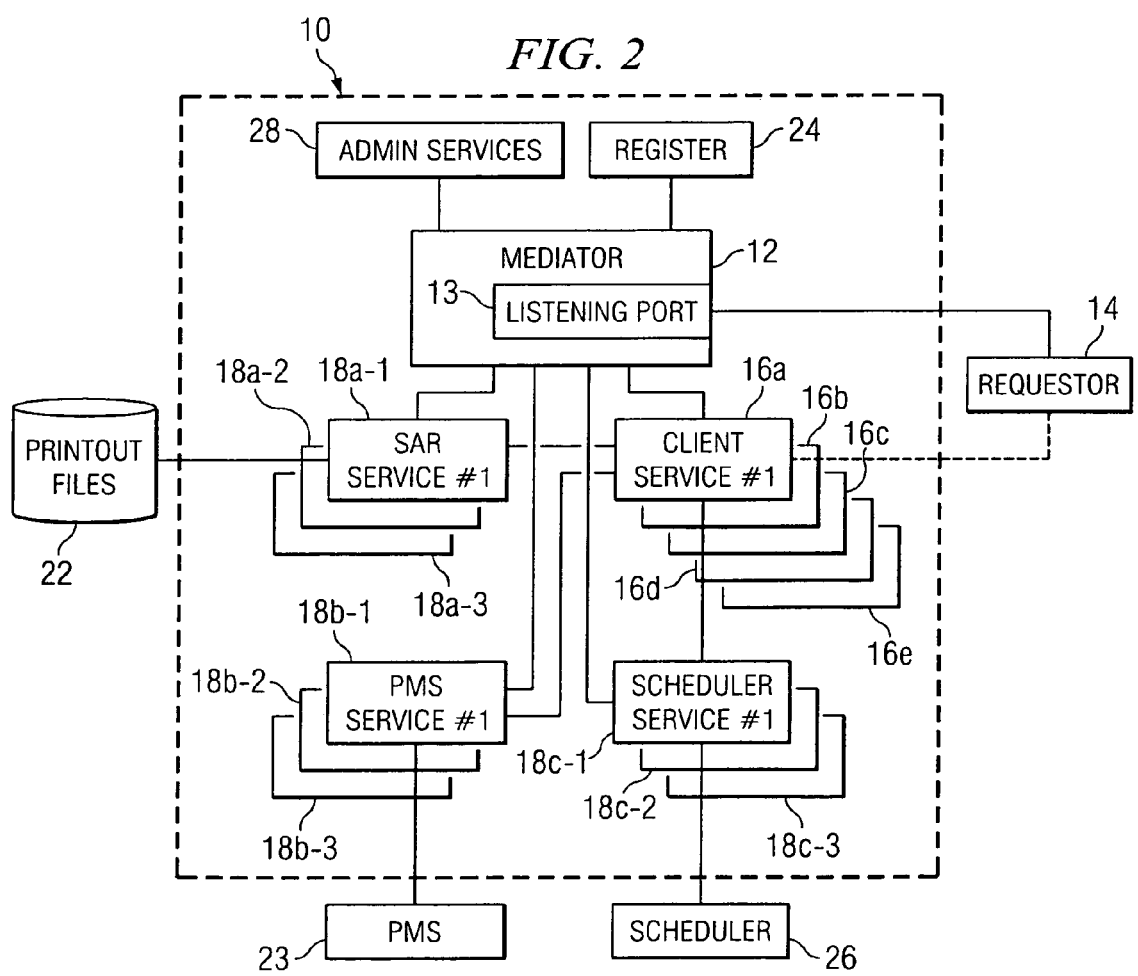
FIG. 2 is a block diagram, according to another embodiment, of the functional components of the information service layer of the present disclosure.

Turning now to FIG. 2 another embodiment of the ISL 10 is depicted. In this embodiment the mediator 12 includes a listening port 13 to which the requestor 14 sends its request. The listening port 13 is operative to receive an unscheduled communication from a requestor 14.

Five instantiations of the client service 16—client service #1 16a, client service #2 16b, client service #3 16c, client service #4 16d, and client service #5 16e—are illustrated as running. Each of the client services 16a-e is an instantiation of the same application which reads through the request sent by the requestor 14 and acts to satisfy the request. In some embodiments more than five or less than five instantiations of the client service 16 may be running.

The retrieval service 18 depicted in FIG. 1, in the embodiment depicted in FIG. 2 has been further particularized to support specific applications or computer systems. All retrieval services 18, however, are endowed with internal logic to accept and properly respond to requests for data and command invocations embedded in the request sent by the requestor 14.

A source archive (SAR) service 18a may provide access to printout files 22. Printout files 22 may be generated by applications running on mainframe computer systems and capture information about the processing conducted by the applications. This information may be stored in text files in a format which is not readily accessible to human readers. The files may be continuously appended to as applications execute. The files may be closed when they achieve a maximum file size and a new file opened for writing. The files may be closed when a specified length of time passes and a new file opened for writing. Multiple instantiations—

SAR service #1 18a-1, SAR service #2 18a-2, and SAR service #3 18a-3—of the same SAR service 18a application are illustrated as running. In some embodiments more or fewer instantiations of the SAR service 18a may be running.

A problem management system (PMS) service 18b may provide access to a PMS 23. Multiple instantiations—PMS service 18b-1, PMS service 18b-2, and PMS service 18b-3—of the same PMS service 18b application are illustrated as running. In some embodiments more or fewer instantiations of the PMS service 18b may be running. A PMS 23 may hold trouble tickets or other artifacts recording the details of a reported problem. The PMS 23 may support updating during the life of the trouble tickets as the reported problem is worked on over time and may retain trouble tickets for resolved problems for historical purposes.

A scheduler service 18c may provide access to a scheduler 26. Multiple instantiations—scheduler service #1 18c-1, scheduler service #2 18c-2, and scheduler service #3 18c-3—of the same scheduler service 18c application are illustrated as running. In some embodiments more or fewer instantiations of the scheduler service 18c may be running. In some embodiments the scheduler may be a CA-7 scheduler from Computer Associates. In one embodiment, access to this scheduling system might provide detailed information related to the sequence of tasks or jobs that have already or are planned to be executed. This information could be used in conjunction with job execution information from the source archive and problem management queries to provide current state, forecast completion, or assist in either resolving an existing failure or predicting a pending one.

ISL 10 is intended to accept concurrent requests from multiple requesters 14. The purpose of ISL 10 executing multiple instantiations of client service 16 and multiple instantiations of retrieval services 18 is to reduce the chance that when the requestor 14 sends a request that the requestor 14 will have to wait or be denied service and have to resubmit a request at a later time because the designated retrieval service 18 is busy. If the mediator 12 finds there is no idle client service 16 to handle a request, the mediator 12 brings an additional instantiation of client service 16 into operation. In some embodiments if there are no idle retrieval services 18a, 18b, or 18c available to handle a request, the mediator 12 may bring an additional instantiation of the appropriate retrieval service into operation.

For other systems or applications additional retrieval services 18 may be needed to provide access to those systems or applications. Access to systems or applications may include both retrieval of data and issuing commands. An additional retrieval service ~18 may provide access to a code control system (a code control system is a computer program which supports managing code or software changes).

A register 24 contains information about each instantiation of the client service 16 and each instantiation of the retrieval services 18a–c. The information stored in the register 24 is employed to pass work to and control the interworking of the client services 16 or retrieval services 18a–c. This information may include an indication whether the represented service is busy or idle and an indication of what action to take on completion of a task (referred to below as action-on-completion information). Each of the instantiations of client services 16 and retrieval services 18a–c create entries in, the register 24 during initialization. In one embodiment the register 24 entries may include a process id (PID) identifying the service associated with the entry and a signal number on which the operating system will reawaken the idle or sleeping service.

An administrative services component 28 supports starting and stopping the various services. The administrative services component 28 may support bringing new retrieval services 18a–c into operation which had not previously been part of the ISL 10.

Figure 3:
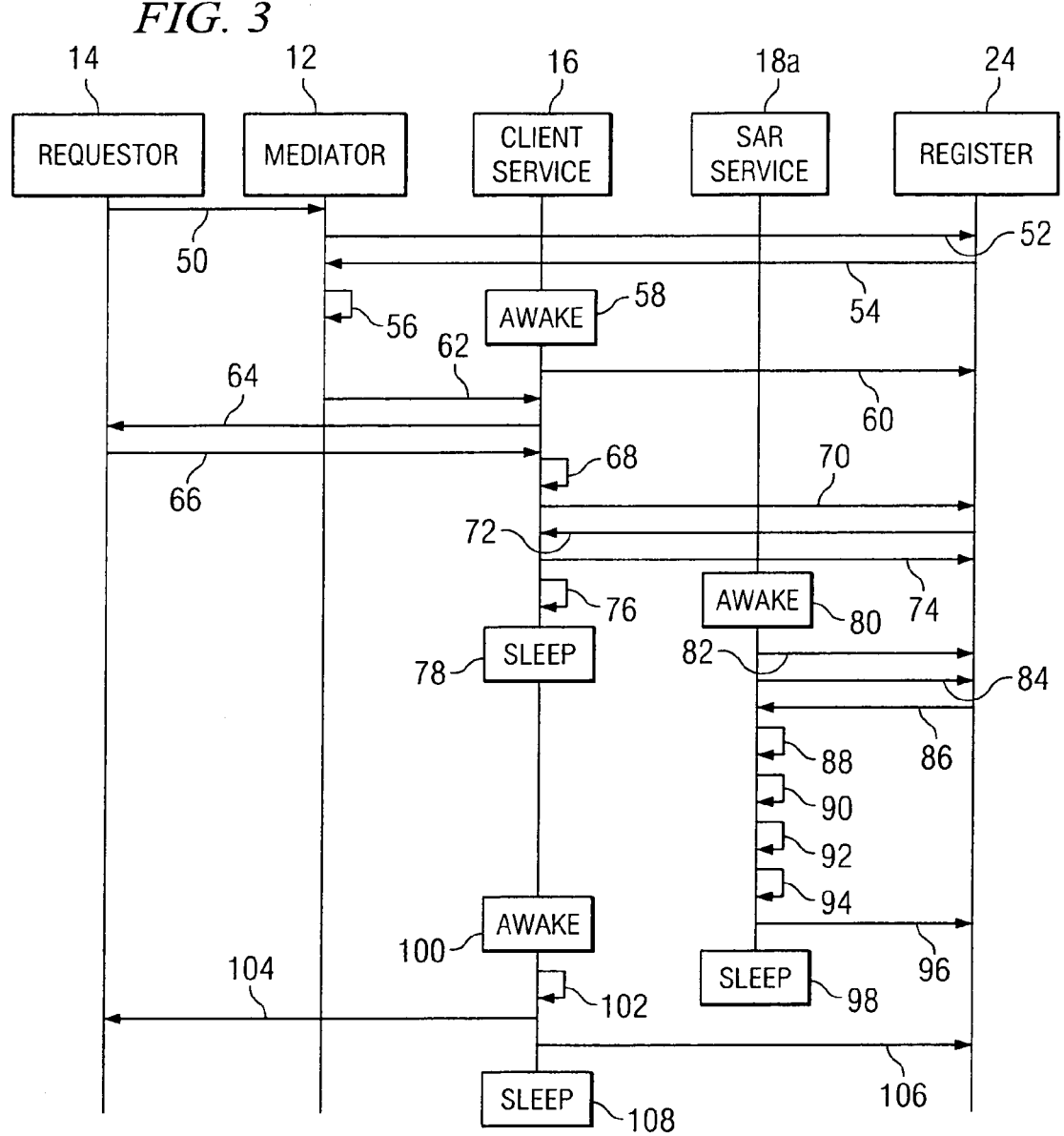
FIG. 3 depicts an exemplary information service layer request-response message sequence.

Turning now to FIG. 3 an exemplary request-response cycle of the ISL 10 is depicted. Note, however, that the present disclosure should not be limited by this exemplary request-response cycle. The requestor 14 sends a communicationRequest message 50 to the mediator 12. In some embodiments the communication with the requestor 14 may be via a socket communication mechanism. The requestor 14 may address its initiating communicationRequest message 50 to the known computer system and the known protocol port of the listening port 13. In some embodiments the operating system may not support the socket communication mechanism, and in this case another equivalent communication mechanism may be employed.

To identify an idle client service 16 instantiation, the mediator 12 sends a clientServiceLookup message 52 to the register 24. The register 24 searches its contents, finds an idle client service 16 instantiation, and sends a clientServiceFound message 54 to the mediator 12 which identifies the idle client service 16 instantiation. The clientServiceFound message 54 may contain a process identifier (PID) of the idle client service 16 instantiation and the signal by which the mediator 12 may cause the operating system to put the idle client service 16 instantiation into operation. In action 56 the mediator 12 activates the appropriate signal to cause the client service 16 instantiation to awake. In some embodiments the register 24 may not be intelligent and the mediator 12 may read through each entry of the register 24 using successive read requests until the mediator 12 reads an entry which is associated with an idle client service 16 instantiation. In some embodiments the operating system may not support signals, and in this case another equivalent mechanism to bring an idle client service 16 instantiation into operation may be employed.

The client service 16 instantiation awakes at label 58. The client service 16 instantiation sends a clientServiceBusy message 60 to the register 24 causing the register 24 entry associated with the client service 16 instantiation to indicate busy status. The mediator 12 sends a socketHandoff message 62 identifying the pertinent communications link information for requestor 14 to the client service 16 instantiation. The mediator 12 frees the listening port 13 to listen for other new requests. The client service 16 instantiation sends a socketReady message 64 to the requestor 14 establishing a socket communication link with the requester 14.

The requester 14 sends a requestDocument message 66 over the socket link to the client service 16 instantiation. The requestDocument message 66 contains a document describing the information or data request. In some embodiments the document may be in extensible markup language (XML) format. XML is preferred because it provides for the integration and collation of any data and information regardless of storage environment or document type, because it enables data interchange and is platform and application independent, because it supports customization and personalization of information, and because it is extensible. While XML format is preferred for its extensibility and its ability to describe data through tags, the relationship between data elements through the nesting of this; tag, and requested criteria and functions through the content encapsulated by tags, in other embodiments an alternative document format may be employed. The term 'document' is conventional when referring to XML, HTML, or other tag-based markup languages and refers to a sequence of tags and enclosed data. In other embodiments some format other than a document format may be employed to send the request. In some embodiments the request is passed to the mediator 12, and the mediator 12 forwards the request to the client service 16 instantiation.

The requested XML document embeds a designation of both the computer system on which to locate the data and the retrieval service 18 which must be employed to retrieve the data specified in the request XML document. If the designated computer system is the local computer system, in action 68 the client service 16 writes the request XML document into a file and notes the designated retrieval service 18.

The client service 16 instantiation sends a sarServiceLookup message 70 to the register 24 (this example request-response sequence assumes that a SAR data access is needed, and in the case that the request is for a different data access, an alternative service lookup would occur). The register 24 searches its contents, finds an idle SAR service 18*a* instantiation, and sends a sarServiceFound message 72 to the client service 16 instantiation which identifies the idle SAR service 18*a* instantiation. The sarServiceFound message 72 may contain the signal by which the client service 16 instantiation may cause the operating system to put the idle SAR service 18*a* instantiation into operation.

The client service 16 instantiation sends serviceUpdate message 74 to the register 24 which causes the entry associated with the idle SAR service 18*a* instantiation to be updated with the name of the request document file written by the client service 16 instantiation and to be updated with the signal associated with the client service 16 instantiation wake-up. In action 76 the client service 16 instantiation activates the appropriate signal to cause the SAR service 18*a* instantiation to awake. The client service 16 instantiation then puts itself to sleep at label 78.

In some embodiments the client service 16 instantiation may save information about the progress the client service 16 instantiation has made in handling the requestor 14 request, write to the register 24 entry associated with the client service 16 instantiation an idle indication, and then put itself to sleep. In such an embodiment, the SAR service 18*a* instantiation would signal to any idle client service 16 instantiation when returning data. This clients service 16 instantiation perhaps—a different client service instantiation than the one which sent the signal in action 76 which woke up the SAR service 18*a* instantiation—then accesses the saved information which indicates the progress made in handling the requester 14 request. In some embodiments the operating system may not support signals: in this case another equivalent mechanism to bring an idle SAR service 18*a* instantiation into operation may be employed.

The SAR service 18*a* instantiation is awakened by the operating system at label 80. The SAR service 18*a* instantiation sends a sarServiceBusy message 82 to the register 24 causing the register 24 entry associated with the SAR service 18*a* instantiation to indicate busy status. The SAR service 18*a* instantiation sends a getSAREntry message 84 to the register 24. The register 24 returns a putSAREntry message 86 to the SAR service 18*a* instantiation which contains information including the name of the request document file and the action-on-completion for the SAR service 18*a* instantiation.

In action 88 the SAR service 18*a* instantiation reads the request document file or files. In action 90 the SAR service 18*a* instantiation follows the instructions embedded in the request document file to access data out of the printout files 22. In some embodiments the client service 16 instantiation may send the request document directly to the SAR service 18*a* instantiation as a message. Other communications means and pathways may be employed for access to the retrieval services 18.

In action 92 the SAR service 18*a* instantiation follows the instructions embedded in the request document file to write the accessed data into a response document file. The name of the response document file is deterministically related to the name of the request document file. For example, if the request document file name is *Request.xml the response document file name may be *Response.xml. In some embodiments the response document may be in XML format. In other embodiments an alternative document format may be employed. In some embodiments actions 88 and 90 may be combined and not separate steps. In some embodiments actions 90 and 92 may be combined and not separate steps. In some embodiments actions 88, 90, and 92 may be combined and not separate steps. In some embodiments the response document may be returned to the client service 16 instantiation in a message from the SAR service 18*a* instantiation to the client service 16 instantiation.

In action 94 the SAR service 18*a* instantiation activates the appropriate signal to cause the client service 16 instantiation to awake. The SAR service 18*a* instantiation sends a sarServiceIdle message 96 to the register 24 causing the register 24 entry associated with the SAR service 18*a* instantiation to indicate idle status. The SAR service 18*a* instantiation then puts itself to sleep at label 98.

The client service 16 instantiation is awakened by the operating system at label 100. In action 102 the client service 16 instantiation reads the response document file. The client service 16 instantiation sends a responseDocument message 104 over the socket link to the requestor 14 containing the response document describing the requested information or data and closes the socket communication link. In some embodiments the document may be in XML format, and in such embodiments the client service 16 instantiations and retrieval service 18*a–c* instantiations are XML operable. In other embodiments an alternative document format may be employed, and in such embodiments the client service 16 instantiations and retrieval service 18*a–c* instantiations are operable to work with this alternative document format. In some embodiments the client service 16 instantiation may delete the request document file and the response document file after closing the socket communication link to the requestor 14.

The client service 16 instantiation sends a clientServiceIdle message 106 to the register 24 causing the register 24 entry associated with the client service 16 instantiation to indicate idle status. The client service 16 instantiation then puts itself to sleep at label 108, completing the request-response cycle. In some requestor 14 requestDocument messages 66 multiple retrieval services 18 may be designated. In this case the client service 16 instantiation may conduct multiple retrieval service 18 sessions similar to the sequence 80 through 98 with a series of retrieval services 18.

If the computer system designated in the request XML document sent by the requestor 14 to the client service 16 is not the local computer system, the client service 16 instantiation in the present embodiment acts as a proxy requester and forwards the request on to the ISL 10 on the remote designated computer system.

Figure 4:
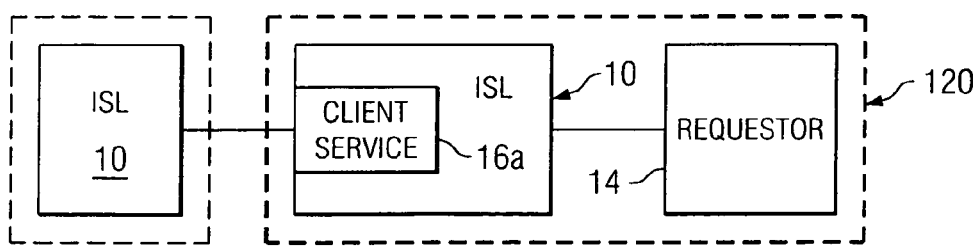
FIG. 4 depicts an example of an information service layer acting in the role of a proxy requestor.

Referring now to FIG. 4 a local ISL 10 is shown forwarding a request from a requestor to a remote ISL 10. In this example the requestor 14 is illustrated as running on the same computer system 120 as the local ISL 10, though the requester 14 may be running on some other computer system. The information which the requestor 14 requests is located on a remote computer system 122 which supports its own ISL 10.

The client service 16*a* instantiation on the local computer system 120 may communicate with the local mediator 12 to obtain communication information to enable the client service 16 to communicate with the ISL 10 on the remote designated computer system. The local mediator 12 may look this information up in a configuration file. In some embodiments the information in the configuration file may map the name of a designated computer system to the internet protocol (IP) address of the remote computer system and the protocol port number of the listening port for the ISL 10 on that remote computer system. In some embodiments the protocol port number of the listening port may be hard coded and common among all deployed ISLs 10, and in this case there may be no need to store the protocol port number of the listening port in the configuration, file. If communication mechanisms other than sockets are employed, other communications information may be stored in the configuration file such as universal reference locator (URL) or other.

The client service 16*a* instantiation may be said to act as a proxy requester. That is to say, from the viewpoint of the ISL 10 on the remote computer system 122 the client service 16*a* instantiation on the local computer system 120 appears to be a requestor 14. The client service 16*a* instantiation on the local computer system 120 follows the request protocol as a normal requestor 14 would follow the request protocol. In some embodiments the local client service 16*a* instantiation may register with the remote register 24 and interact directly with the appropriate remote retrieval service 18*a–c* on the remote computer system 122.

While not depicted in FIG. 4, it is possible for the ISL 10 operating on the remote computer system 122 to itself act as a proxy requestor and forward the original request on to yet a further removed ISL 10 not shown. There is no functional limit to the depth of such a series of proxy requests.

The example description of a request-response cycle above is only exemplary and is not intended to constrain or limit the disclosure or claims in any way. The names of the messages are arbitrary and in some embodiments may be differently named and contain different information. The example described a request for data, but it may have been a request to command some action or series of actions to be taken by an application.

Any instructions or logic embedded in an XML document are viewed as data from the perspective of an XML parser. The meaning of the data embedded in an XML document is constructed by the applications which employ the XML document. An example XML document embedding an information or data request for use with the ISL 10 is presented below. This example will be followed by a line-by-line description of the meaning constructed upon the XML data contained within the example XML document.

```
 1: <SYSID><NAME>BILLING_SERVER</NAME>
 2: <SAR>
 3: <DBASE><NAME>BILLSYS.JCL.DB7</NAME></
    DBASE>14: <PARSE>
 5: <ID>PIP*</ID><DATA>02/10/03:02/20/03</DATA>
 6: <FIND><NEXT>CZT1765</NEXT></FIND>
 7:        <TAGNAME><NAME>JOBNAME</
    NAME><LENGTH><OFFSET>8</
    OFFSET><FTAGNAME>
 8:        <TAGNAME><NAME>START</
    NAME><LENGTH>8</LENGTH><POS>2</POS></
    TAGNAME>
 9: <FIND><NEXT>CZT1775</NEXT><LENGTH>7</
    LENGTH></TAGNAME>
10:        <TAGNAME><NAME>ENDED</
    NAME><LENGTH>8</LENGTH><POS>2</POS></
    TAGNAME>
11: <FIND><PREV>-JOBNAME</PREV></FIND>
12: <UNTIL>
13:        <STOPAT><VALUE>CZT1775</
    VALUE><LENGTH>7</LENGTH><LINE>1</
    LINE></TAGNAME>
14:        <SKIPUNTIL><VALUE>-</
    VALUE><LENGTH>1</LENGTH></SKIPUNTIL>
15:     <TAGNAME><NAME>STEPSTART</
    NAME><LENGTH>8</LENGTH><OFFSET>-19</
    OFFSET></TAGNAME>
16:        <TAGNAME><NAME>STEP</
    NAME><LENGTH>8</LENGTH><TAGNAME>
17:        <TAGNAME><NAME>PROC</
    NAME><LENGTH>8</LENGTH><OFFSET>19</
    OFFSET></TAGNAME>
18:        <TAGNAME><NAME>RC</
    NAME><LENGTH>5</LENGTH><OFFSET>28</
    OFFSET></TAGNAME>
19:        <TAGNAME><NAME>EXCP</
    NAME><LENGTH>6</LENGTH><OFFSET>34</
    OFFSET></TAGNAME>
20:        <TAGNAME><NAME>CPU</
    NAME><LENGTH>6</LENGTH><OFFSET>42</
    OFFSET></TAGNAME>
21:        <TAGNAME><NAME>ELAPSED</
    NAME><LENGTH>6</LENGTH><OFFSET>56</
    OFFSET></TAGNAME>
22: </UNTIL>
23: </PARSE>
24: </SAR>
25: </SYSID>
```

Line 1: Route request to the ISL 10 on the BILLING_SYSTEM computer system.

Line 2: Use the SAR service 18*a*.

Line 3: Open the BILLSYS.JCL.DB7 SAR database.

Line 4: Parse all data using the following commands.

Line 5: Locate all reports that begin with PIP that were created on Feb. 10, 2003 through Feb. 20, 2003

Line 6: Search the report for "CZT1765".

Line 7: Skip over 8 characters from the position that the text was found and grab the next 8 characters. Build an output tag called JOBNAME and use it to encapsulate the located value in the output XML document file.

Line 8: Grab the 8 characters beginning at position 2 on the line that the FIND is pointing to and create a tag called START and use it to encapsulate the located value in the output XML document file.

Line 9: Search further down the report for "CZT1775".

Line 10: Grab the 8 characters beginning at position 2 on the line that the FIND is pointing to and create a tag called ENDED and use it to encapsulate the located value in the output XML document file.

Line 11: Search backwards through the report for "JOBNAME".

Line 12: Begin looping through the report.

Line 13: If the value "CZT1775" is found then stop the loop, otherwise skip down to the next line in the report.

Line 14: Check for a "-" and skip any line that does not have that character in the same position as the found text.

Line 15: Create a tag in the output XML document file called STEPSTART encapsulating the 8 characters at an offset of 19 characters before the found text position.
Line 16: Create a tag in the output XML document file called STEP encapsulating the 8 characters at an offset of 10 from the found text position.
Line 17: Create a tag in the output XML document file called PROC encapsulating the 8 characters at an offset of 19 from the found text position.
Line 18: Create a tag in the output XML document file called RC encapsulating the 5 characters at an offset of 28 from the found text position.
Line 19: Create a tag in the output XML document file called EXCP encapsulating the 6 characters at an offset of 34 from the found text position.
Line 20: Create a tag in the output XML document file called CPU encapsulating the 6 characters at an offset of 42 from the found text position.
Line 21: Create a tag in the output XML document file called ELAPSED encapsulating the 6 characters at an offset of 56 from the found text position.
Line 22: End of commands within this loop.
Line 23: End of parsing commands.
Line 24: End of commands for the SAR service.
Line 25: End of requests for this system.

An example output XML document embedding a response to the above information or data request is presented below.

```
<RESULTS>
<SYSOUT>
<SYSOUT_ID>XYZ280</
    SYSOUT_ID><SEQ_KEY>XYZ280</
    SEQ_KEY><JOB>JOB65241</JOB><GEN>7982</
    GEN><SSEQNO>7823</SSEQNO><ARCDT>01/20/
    03</ARCDT><ARCTM>13:18:15</
    ARCTM><PRTDT>00/00/00</
    PRTDT><LINES>5373</LINES><PAGES     37</
    PAGES><BLKS>31</BLKS><XCODE></
    XCODE><TAPSEQ>4450</TAPSEQ>
<JOBNAME>XYZ280</JOBNAME>
<START>12.37.5</START>
<ENDED>12.43.52</ENDED>
<ROW>
<STEPSTART>12.37.52</STEPSTART>
<STEP>KEQ873FGW</STEP>
<PROC>FGW@20</PROC>
<RC>00</RC>
<EXCP>22</EXCP>
<CPU>.00</CPU>
<ELAPSED>.00</ELAPSED>
</ROW>
<ROW>
    (more row information similar to that above)
</ROW>
. . . (other row blocks)
</SYSOUT>
<SYSOUT>
<SYSOUT_ID>XYZ281</
SYSOUT_ID><SEQ_KEY>XYZ281</
SEQ_KEY><JOB>JOB65243</JOB><GEN>3428</
GEN><SSEQNO>7823</SSEQNO><ARCDT>01/20/03</
ARCDT><ARCTM>12:55:08</ARCTM><PRTDT>00/00/
00</PRTDT><LINES>   5373</LINES><PAGES    26</
PAGES><BLKS>              21</BLKS><XCODE>
</XCODE><TAPSEQ>4450</TAPSEQ>
    <JOBNAME>XYZ281</JOBNAME>
    <START>12.38.0</START>
    <ENDED>12.44.22</ENDED>
<ROW>
    (row information like that above>
</ROW>
. . . (other row blocks)
/SYSOUT>
. . . (other sysout blocks)
</RESULTS>
```

These XML documents and document fragments above are only intended as an example. Those skilled in the art may readily conceive of how this example may be extended to provide the ability to request data, to request commands be executed, and to return requested data employing XML documents. While XML may be preferred, document formats other than XML may be employed to request data, to command actions, and to return requested data. In some embodiments some format other than document format may be employed for communicating requests and commands as well as communicating responses. All of these are contemplated by this embodiment of the ISL 10.

The ISL 10 described above is readily extensible to deploy support for new retrieval services 18. All that is needed is that the software to access the data and to request command execution in the new system, application, or database be written and designed to inter-work with the client service 16 as described above. The administration services component 26 may be employed to bring the new retrieval service 18 into operation on the ISL 10.

Figure 5:
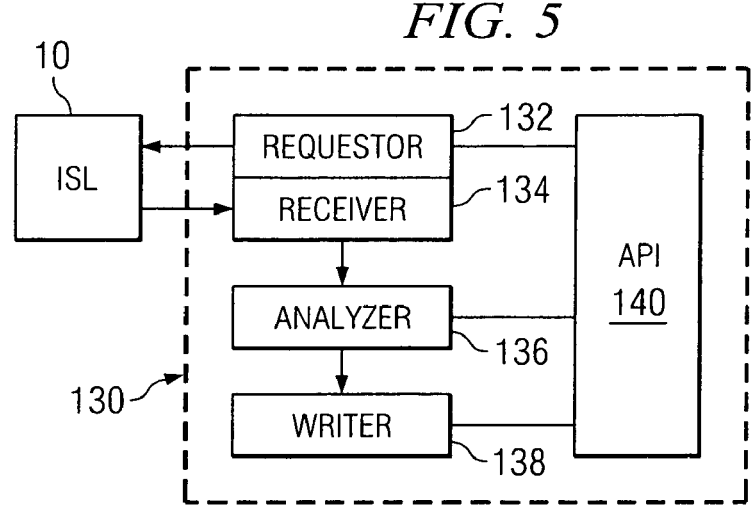
FIG. 5 is a block diagram, according to one embodiment, of the functional components of an information command layer of the present disclosure.

The ISL 10 described above is intended to provide service to a broad range of clients who are only constrained by needing to employ the appropriate request communication sequence and to employ the appropriate request document format. Turning now to FIG. 5, an information command layer (ICL) 130 is depicted. The ICL 130 may be a client, such as the requestor 14, of the ISL 10. A requestor 132 component is closely coupled to a receiver 134 component. In some embodiments these two components may not be separable but may be one functional block. The requestor 132 sends requests to an ISL 10 to collect data. The requestor 132 sends a requestDocument message 66 to the ISL 10 describing the data requested and the format in which to represent the response. This information is embedded in a request document—also referred to as an ISL script—which in some embodiments may be in XML format as previously discussed. In some embodiments a different response document format may be employed.

The receiver 134 receives the response returned by the ISL 10. The receiver receives a responseDocument message 104 from the ISL 10 containing a response document which contains the data in the format requested. The response document in some embodiments may be in XML format as previously discussed. In some embodiments a different request document format may be employed.

In some embodiments the communication between the ICL 130 and the ISL 10 may be via a socket communication mechanism. In some embodiments a different communication mechanism may be employed.

The receiver 134 transfers the data in the response to an analyzer 136 which manipulates the data. The analyzer 136 transfers the processed data to a writer 138 which formats the processed data. In some embodiments the analyzer 136 and writer 138 may not be separable but may be a single functional block. The resultant manipulated and formatted data may be written to a file or may be streamed to a client of the ICL 130. An application programming interface (API)

140 may be provided in some embodiments to allow external agents to invoke the ICL 130 and to receive the product of the ISL 10.

The analyzer 136 and writer 138 both operate upon the response data according to instructions embedded in a command document file which may be referred to as an ICL script. This ICL script may be formatted in XML format or in some other document format. The ICL script may be made available to the analyzer 136 and writer 138 by sending the ICL script as an input parameter when invoking the ICL 130 via the API 140. Alternatively, the ICL script may be made available to the analyzer 136 and writer 138 by identifying the ICL script in the API invocation of the ICL 130, with the ICL script file being located in the local computer system file system. A diverse set of ICL scripts may be loaded into the local computer file system as part of installing the ICL 130. The ISL 10 script may be stored in the local computer file system, may be provided as an input parameter to the API 140, or may be extracted from the ICL script.

The ICL 130 may manipulate, sum, subtract, and combine data received in a response document from the ISL 10. For example, the ICL 130 may request some billing processing data from the ISL 10 with a request document, receive the billing processing data from the ISL 10 in a response document, analyze the response document to calculate the processing rate of different billing applications (wireless services billing, consumer long distance billing, commercial long distance billing, etc.), and write the billing processing rate for each of these services into an output file or report. The ICL 130 may also receive its input data document from some other source, other than ISL 10, that adheres to the ICL 130 input data document format.

The ICL 130 and its components may execute on a mainframe, work station, or general purpose computer system. General purpose computer systems are discussed in more detail hereinafter. The various components of the ICL 130 may execute on the same computer or they may execute on different and separate computers.

Figure 6:
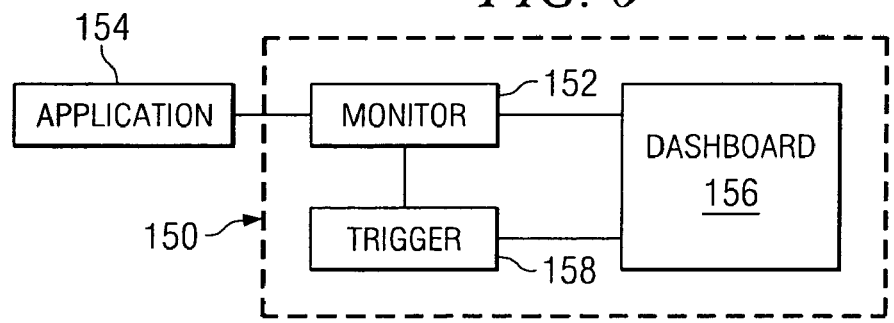
FIG. 6 is a block diagram, according to one embodiment, of a centralized application monitor/early warning operations console system of the present disclosure.

Turning now to FIG. 6 a system 150 for monitoring applications, databases, or computer systems is depicted. A monitor 152 is operative to observe or monitor an application 154, for example to obtain application 154 related information and statistics. A dashboard 156 is operative to receive and display summary information from the monitor 152 on an instrument panel or on a computer screen, perhaps in association with one or more audio speakers.

The summary information display may be of the nature to indicate a value in a range—such as a numeric display, a bar graph or histogram indication, a meter-type or steam-gauge type instrument, an audio volume based indication (louder means more or less of the indicated value), an audio tone based indication (higher pitch means more or less of the indicated value), or other such indication—or may be of the nature to indicate that a state exists or does not exist—such as a condition light or "idiot-light", an alarm light, a flashing light, an audio tone, an audio on-off tone, or other such indication. The monitor 152 communicates with a trigger 158 which is operative to send an signal, event, or message to the dashboard when an operational parameter or derived parameter of the application 154 exceeds a defined operational limit. The signal sent by the trigger 158 may cause the dashboard 156 to generate a visual alert cue or an audio alert cue.

The system 150 for monitoring applications, databases, or computer systems and its components may execute on a mainframe, work station, or general purpose computer system. General purpose computer systems are discussed in more detail hereinafter. The various components of the system 150 may execute on the same computer or they may execute on different and separate computers.

Figure 7:
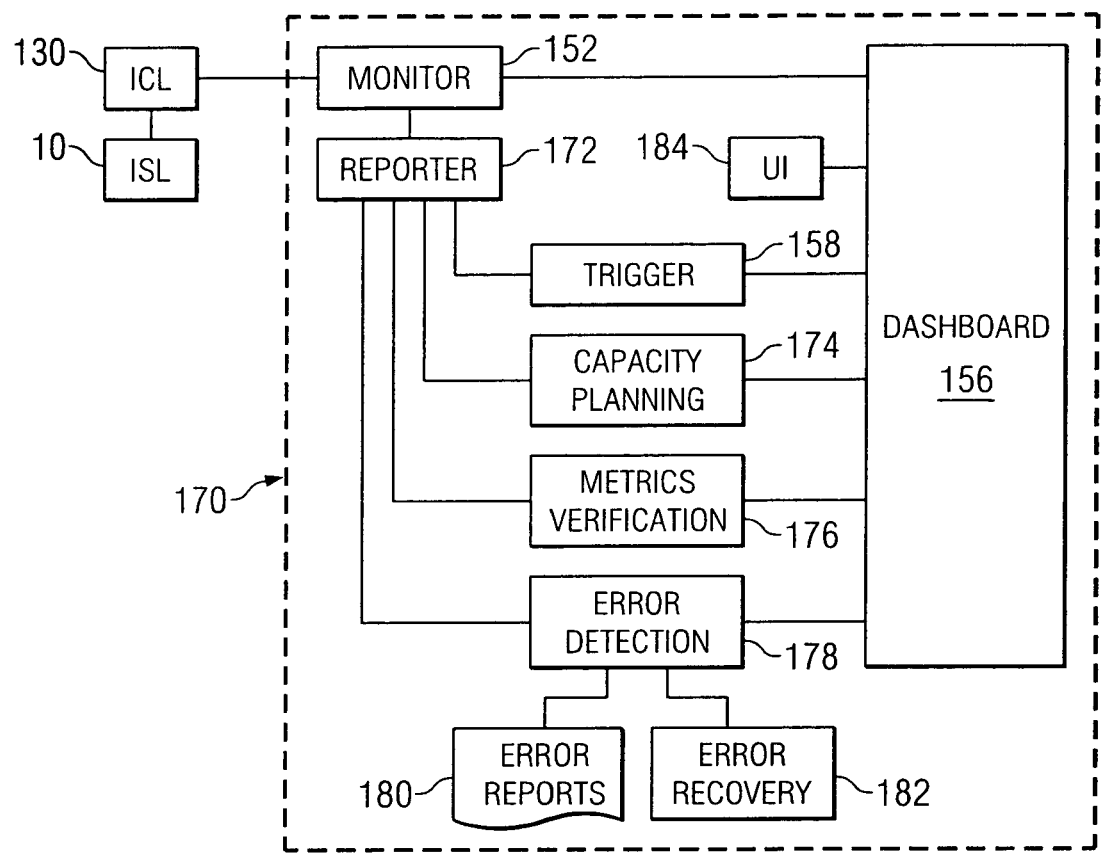
FIG. 7 is a block diagram, according to another embodiment, illustrating the functional components of the centralized application monitor/early warning operations console system of the present disclosure.

Turning now to FIG. 7 a capacity management, centralized monitoring, and early warning operations console (CAMEO) 170 is depicted. The CAMEO 170 is a more fully featured embodiment of the system 150. The monitor 152 is operative to observe or monitor the application 154 through invoking the ICL 130 to produce reports on the application 154. The ICL 130 generates the reports utilizing the functionality of the ISL 10. It is within the scope of the present disclosure that multiple applications 154, not shown, may be observed or monitored concurrently by CAMEO 170.

The monitor 152 is in communication with a reporter 172 which allows the parameters observed by the monitor 152 to be accessible to the trigger 158, a capacity planning 174, a metrics verification 176, and an error detection 178. The dashboard 156 is operable to control and communicate with the monitor 152, the reporter 172, the trigger 158, the capacity planning 174, the metrics verification 176, and the error detection 178, as well as to receive information, reports, or signals from these components.

The error detection 178 is in communication with an error reports 180 and an error recovery 182. A user interface (UI) 184 is operative to display information and to provide user control of the CAMEO 170. In some embodiments the UI 184 may be web enabled.

The trigger 158 may be configured by the UI 184 to activate or trip or break when the parameter of interest exceeds or drops below a threshold value. Some triggers 158 may be hard coded with static threshold values. When the trigger 158 is activated some action is taken which may include sending an alert signal to the dashboard 156 to cause an indication to be presented via the UI 184 or to interact with an application 154 to take corrective action. An example of a trigger 158 may be customer bill generation falling 10 minutes behind schedule. The trigger 158 may serve the purpose, in some embodiments, of an early warning system so action can be taken to prevent an operational failure before the operational failure or degradation of performance occurs.

The trigger 158 may be configured by the UI 184 to latch upon activation. A trigger 158 which supports latching function may continue to send an active signal even after the parameter monitored by the trigger 158 returns to a normal value. The latching function may be disabled either by UI 184 acknowledgement or by passage of a default or a configurable length of time. A trigger 158 which supports latching function may continue to send an active signal after acknowledgement or the passage of time when the monitored parameter continues to be outside normal bounds. A trigger 158 which supports latching function which has activated and thereafter been acknowledged may de-activate when the monitored parameter returns to normal bounds. Some triggers 158 may be hard coded to support latching function.

It is contemplated that multiple triggers 158—perhaps many triggers 158—may be deployed concurrently in the CAMEO 170 system. A trigger 158 may depend upon periodic information updates on the parameter it is concerned with. Different triggers 158 may have different periods for information update. For example, a trigger 158 which activates when call detail record (CDR) errors exceed 10% of generated CDRs may be scheduled to update its data and analyze the CDR error rate on an hourly basis. As another example, a trigger 158 which activates when accounts receivable delinquency passes a 2% threshold may be scheduled to update its data and analyze accounts receivable delinquency on a daily basis.

Each different trigger 158 may be associated with an individual ICL 130 script and ISL 10 script which extract the information monitored, via the monitor 152, by the trigger 158. The monitor 152 may be responsible for scheduling the execution of the various trigger 158 scripts at the appropriate periodic intervals, or this scheduling may be embedded in the trigger 158. The reporter 172 may be responsible for distributing information received by the monitor 152 to the appropriate triggers 158. In some embodiments the trigger 158 may directly invoke the ICL 130 script which returns the information the trigger 158 requires, by-passing the monitor 152 and reporter 172 entirely.

In some embodiments, activation of the trigger 158 may lead to the trigger 158 conducting a request-response session with the ISL 10 to cause the application 154 to take corrective action including resetting its data and or restarting.

The capacity planning 174 of the CAMEO 170 is controlled by the UI 184 which supports these several capacity planning functions. Capacity planning 174 may be supported by dedicated ICL 130 scripts and ISL 10 scripts which are designed to extract the data or information needed to perform various capacity planning analyses and projections.

Capacity planning may be employed to determine the capacity of present resources, current resource utilization, and calculating or otherwise determining future resource capacity requirements to avoid exhausting the capacity of operational resources. Such functionality may permit the timely selection and deployment of new resources, and may support accurate capital budget planning, or suggest redeployment of existing resources to avoid capital expenditures.

Capacity planning 174 may permit analysis of hypothetical business scenarios. To support analysis of such scenarios, the CAMEO 170 may support feeding a XML data file which captures the data representing the hypothetical business scenario to the ICL 130. In some embodiments the UI 184 may support creation of such simulated XML data files to be used as input to the ICL 130. In other embodiments such simulated XML data files may be created with an editor and specified as input to the capacity planning tool via the UI 184. Such scenarios may be employed, for example, to determine the additional capacity required to support a new customer with 10,000 subscribers or to analyze the effect of redeploying bill generation computation resources according to a new plan. In some embodiments the ICL 130 scripts which support capacity planning 174 may be invoked directly by the capacity planning 174 component.

Metrics verification 176 is intended to check operational status. For example, a large telecommunications company may have 50 separate billing cycles which it supports every month. Completion of a morning bill generation cycle may be required before an afternoon billing cycle can begin. If the morning bill generation cycle is delayed, this delay has implications for the afternoon billing cycle and perhaps billing cycles of subsequent days. It may be valuable to analyze and evaluate the timeliness of each billing cycle. Metrics verification 176 is directed to support such analysis. The information generated by metrics verification 176 may be either a numeric value—minutes behind schedule, piece-parts behind quota for time-of-day, percent of target, or other numeric value—or may be a pass/fail value, for example. The metrics verification 174 may support a high level view of operations as well as detailed drill-down views of sub-components of the operational flow.

The error detection 178 component is planned to monitor specific operational parameters, to generate error reports 180 when errors are discovered, to send error information to the dashboard 156, and in some cases to support error recovery 182 activities. Dedicated ICL 130 and ISL 10 scripts may be employed to provide operational information. Error detection 178 may also involve monitoring customer accounts and validating account policies for self-consistency when those accounts have been modified.

Error recovery 182 may take various forms. For example, when one of a series of batch jobs on a mainframe computer fails, error recovery 182 may interrupt a series of batch jobs on a mainframe computer which must run successfully end-to-end, restarting the first failed batch job, and requeueing or rescheduling the subsequent batch jobs. Error recovery 182 may cause ISL 10 scripts to execute to command the appropriate applications. The error recovery 182 may access the ISL 10 through the intermediary of the ICL 130, or the error recovery 182 may access the ISL 10 directly (if the error recovery 182 is designed to act in the capacity of a requestor 14).

In another example, the error recovery 182 may access a list of on-call personnel and invoke an existing enterprise application to send a paging signal to the appropriate on-call employee. In another example, in the case that an account has been modified and is in an inconsistent state, the error recovery 182 may invoke an existing enterprise emailing application to send a notice to the last person to edit the account and may invoke an existing enterprise PMS to issue a trouble report ticket.

The information shared by error detection 178 with the dashboard 156 may support both a summary level of detail and a detail drill-down level of detail to provide error recovery assistance When error recovery may not be automated. The UI 184 may be employed to access summary error details and to drill-down to lower levels of detail. These lower levels of detail may be stored in the CAMEO 170 or they may be freshly formulated from invoking ICL 130 scripts. For example, if a billing application experiences a failure the UI 184 may show that the billing application is in a failed condition. By clicking on the billing application, the UI 184 may display the information about this billing application being monitored. If, for example, the billing cycle balanced parameter failed, clicking on the billing cycle balanced parameter would prompt the UI 184 to display the script used to monitor billing cycle balancing, to illustrate where the billing cycle was out of balance, and to display the totals associated with this part of the billing cycle.

Corrective actions taken by error recovery 182 may hook into preexisting capabilities of the enterprise such as automated email generation or automated trouble report generation. The error detection 178 capability frees personnel from constant monitoring of error-free cycles—which may constitute the majority of operational cycles—since they need only invest time when an actual error has occurred.

The CAMEO 170 is extensible and may support other operations management, reporting, or command functions. The CAMEO 170 may execute on a general purpose computer system. General purpose computer systems are discussed in more detail hereinafter. The various components of the CAMEO 170 may execute on the same computer or they may execute on different and separate computers. The various capabilities of the CAMEO 170 are non-intrusive, and they do not require modification of existing enterprise applications and do not place a load on those enterprise applications.

Figure 8:
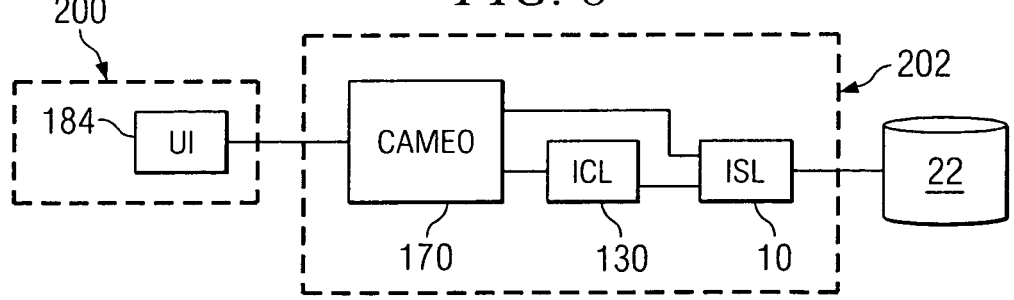
FIG. 8 illustrates one exemplary cooperative configuration of the information service layer, information command layer, the centralized application monitor/early warning operations console system, and a remote desktop user interface.

FIG. 8 is a block diagram illustrating an exemplary integration of the CAMEO 170, the ICL 130, and the ISL 10, with the UI 184 depicted as executing on a desktop computer 200. Although the CAMEO 170, the ICL 130, and the ISL 10 may operate as independent systems, synergies may be obtained by their combination. High-level executives and/or managers of an enterprise may employ this combination employing the UI 184 on the desktop computer 200. As discussed above, the dashboard 156 may be configured to monitor a variety of system or programs useful for making management decisions. The dashboard 156 of the CAMEO 170 may be configured to display information collected on enterprise statistics, such as monitoring the status of bill processing.

To facilitate such monitoring, the ISL 10 may monitor the status of applications that process billing. The bill processing statistics may reside, for example, in the database 22 and include records processed, or other real-time information useful to the manager. The cross-platform compatibility and functionality of the ISL 10 described above enables the ISL 10 retrieve such statistics from the database 22 without the need to create custom application to retrieve, process and form the desired data. The ICL 130 operably requests the desired data request to the ISL 10, which retrieves and returns the data to the ICL 130, substantially as described above. The ICL 130 formats and returns the data based on the format desired by the CAMEO 170. In this manner, the CAMEO 170 displays, via the dashboard 156, the billing statistics for monitoring by the manager on the UI 184.

The dashboard 156 is operable to display the statistics, real-time, as the information is retrieved, formatted and returned from the. ISL 10 and ICL 130, as desired. The present system enables the manager to simply and easily select other systems of interest and retrieve relevant data quickly and efficiently. The ISL 10 is operable to retrieve information on otherwise incompatible system, enabling a new realm of operation management and control. Based on the present disclosure, a myriad of integrated or disparate business systems and processes may be easily selected and monitored by the CAMEO 170, employing the ISL 10 and ICL 120.

Figure 9:
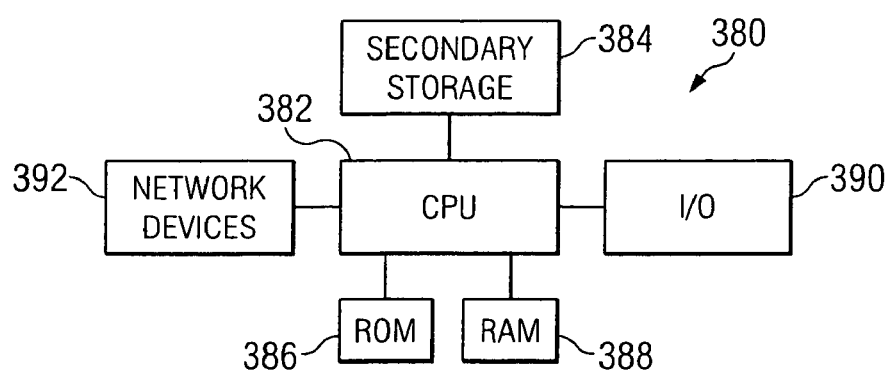
FIG. 9 illustrates an exemplary general purpose computer system suitable for implementing the several embodiments of the information service layer, the information command layer, and the centralized application monitor/early warning operations console system.

The software applications described above—the ISL 10, the ICL 130, the system 150 for monitoring applications, databases, or computer systems, and CAMEO 170—may be implemented on any general-purpose computer with sufficient processing power, memory resources, and network throughput capability to handle the workload placed upon it. FIG. 9 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data; Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What we claim as our invention is:

1. An application monitoring system, comprising:
   a monitor component to monitor statistics related to an application in operation;
   a reporting component in communication with the monitor component and operable to report the statistics of the application in operation monitored by the monitor component;
   a trigger component to analyze the statistics of the application monitored by the monitor component and compare the statistics of the application with a threshold and generate a trigger signal based on the relationship of the statistics to the threshold; and
   a dashboard component operable to identify the monitored application and provide the threshold related to the monitored application;

wherein the monitor component is operable to monitor statistics of a plurality of applications in operation.

2. The application monitoring system of claim 1, wherein the dashboard component includes a user interface.

3. The application monitoring system of claim 2, wherein the dashboard component is coupled to the trigger component and operable to display a message on the user interface of the dashboard component in response to the trigger signal.

4. The application monitoring system of claim 2, wherein the user interface of the dashboard component is further defined as web enabled.

5. The application monitoring system of claim 1, further comprising a repository operable to maintain an error report associated with errors of the application.

6. The application monitoring system of claim 1, further comprising a recovery component operable to initiate a recovery of the application.

7. The application monitoring system of claim 6, wherein the recovery is further defined as restarting the application.

8. The application monitoring system of claim 6, wherein the recovery component is coupled to receive a recovery signal from the trigger component based on the threshold.

9. The application monitoring system of claim 1, wherein the threshold is further defined as a business rule.

10. The application monitoring system of claim 1, wherein the threshold is further defined as a predefined threshold.

11. The application monitoring system of claim 1, wherein the statistics of the application monitored by the monitor component are further defined as an output of the application.

12. The application monitoring system of claim 1, wherein the statistics of the application monitored by the monitor component are further defined as a cycle of the application.

13. The application monitoring system of claim 1, wherein the monitor component monitors a first application on a first system and a second application on a second system.

14. The application monitoring system of claim 13, wherein the first system is a mainframe computer system and wherein the second application is a non-mainframe computer system.

15. An application monitoring system, comprising:
a monitor component to monitor an application in operation;
a trigger component to analyze the statistics of the application monitored by the monitor component and compare the statistics of the application with a threshold and generate a trigger signal based on the relationship of the statistics to the threshold;
a dashboard component operable to identify the application to monitor and provide the threshold related to the application to monitor; and
a requestor component coupled to promote communication between the dashboard component and the monitor component, wherein the monitor component is further defined as an information service layer.

16. The application monitoring system of claim 15, wherein the information service layer includes:
a control system having a registry and operable to communicate with the requestor having a request for data, the request for data including a source identifier and a data identifier;
a client service operable to register with the control system and receive the request for data, the client service further operable to communicate a requested data related to the data identifier to the requestor; and
a retrieval service operable to use at least a portion of the source identifier to retrieve the requested data related to the data identifier and communicate the requested data to the client service.

17. The application monitoring system of claim 16, wherein the request for data from the requestor is further defined as an extensible mark-up language tag.

18. The application monitoring system of claim 15, wherein the data identifier is further defined as an extensible mark-up language string having a plurality of tags identifying the a desired data.

19. The application monitoring system of claim 15, wherein the application being monitored is defined as a mainframe process.

20. The application monitoring system of claim 15, wherein the application being monitored is defined as output from a computer program.

21. The application monitoring system of claim 15, wherein the application being monitored is defined as a telephony process.

22. The application monitoring system of claim 15, wherein the application being monitored is defined as a billing cycle process.

23. A method of monitoring an application, comprising:
selecting an application having data related to metrics of the application to be monitored;
providing a service layer for retrieving data, the service layer including:
a control system having a registry and operable to receive a request for data, the request including a source identifier and a data identifier,
a client service operable to register with the control system and receive the request for data, the client service further operable to communicate a requested data related to the data identifier, and
a retrieval service operable to utilize at least a portion of the source identifier to retrieve the requested data related to the data identifier and communicate the requested data to the client service;
requesting the data from the service layer, the data related to metrics of the application;
receiving the data via the information service layer;
establishing a threshold for the data;
monitoring the data related to metrics of the application;
analyzing the data based on the threshold established for the data; and
signaling when the data exceeds the threshold.

24. The method of claim 23, wherein the request for data from the service layer is further defined as an extensible mark-up language tag.

25. The method of claim 23, wherein the service layer is further defined as a mainframe service layer and wherein the application is a mainframe application.

26. The method of claim 23, wherein the service layer is further defined as a mainframe service layer and wherein the application is a non-mainframe application.

27. The application monitoring system of claim 23, wherein the application being monitored is defined as a telephony process.

28. The application monitoring system of claim 23, wherein the application being monitored is defined as a billing cycle process.

* * * * *